United States Patent [19]

Schneider

[11] 3,949,553

[45] Apr. 13, 1976

[54] HYDRAULIC STEP-MOTOR

[75] Inventor: Wolf Giselher Schneider, Hondelage, Germany

[73] Assignee: Feinmechanische Werke Mainz GmbH, Mainz-Mombach, Germany

[22] Filed: Sept. 5, 1974

[21] Appl. No.: 503,293

[30] Foreign Application Priority Data
Sept. 7, 1973 Germany............................ 2345146

[52] U.S. Cl. .......................... 60/325; 60/493; 91/467
[51] Int. Cl.² .......................................... F15B 11/12
[58] Field of Search ............. 60/325, 368, 487, 493; 91/467, 2, 35

[56] References Cited
UNITED STATES PATENTS

| 2,125,513 | 8/1938 | Martin | 60/368 X |
| 3,460,343 | 8/1969 | Touchman | 60/487 X |
| 3,513,752 | 5/1970 | Perry et al. | 91/35 |

*Primary Examiner*—Edgar W. Geoghegan

[57] ABSTRACT

In combination with a hydraulic step motor comprising a servo-valve having a rotary valve member and a housing surrounding this member. The rotary valve member is provided with two fluid manifolds conjointly movable therewith. Two main conduits communicating with a source of fluid under pressure provide passage for the fluid to the servo-valve and to the fluid manifolds.

A drivable shaft of the step motor is connected to the servo-valve rotary member to drive same. The rotary valve member comprises a plurality of primary positioning projections and of secondary sealing projections alternately spaced from one another and uniformly distributed around the periphery of the rotary valve member. Between the adjacent projection gaps are formed which are alternatively connected with one and the other of the fluid manifolds. Fluid channels provided in the wall of the housing open towards the periphery of the rotary valve member. These channels are distributed over the rotary valve member in equal distances different by at least one in number from those existing between the primary projections. A selector valve is arranged and interposed in each of the channels leading to a return conduit to a sump wherefrom the source of fluid under pressure receives the fluid.

In idle condition, the channels are closed and the fluid flow is blocked. Opening of a selected one of the channels provokes an abrupt drop of fluid pressure in a selected gap and revolution of the rotary valve member. By selection of the gap wherefrom the fluid under pressure is released, rotation may be caused in one or the other selected direction.

17 Claims, 2 Drawing Figures

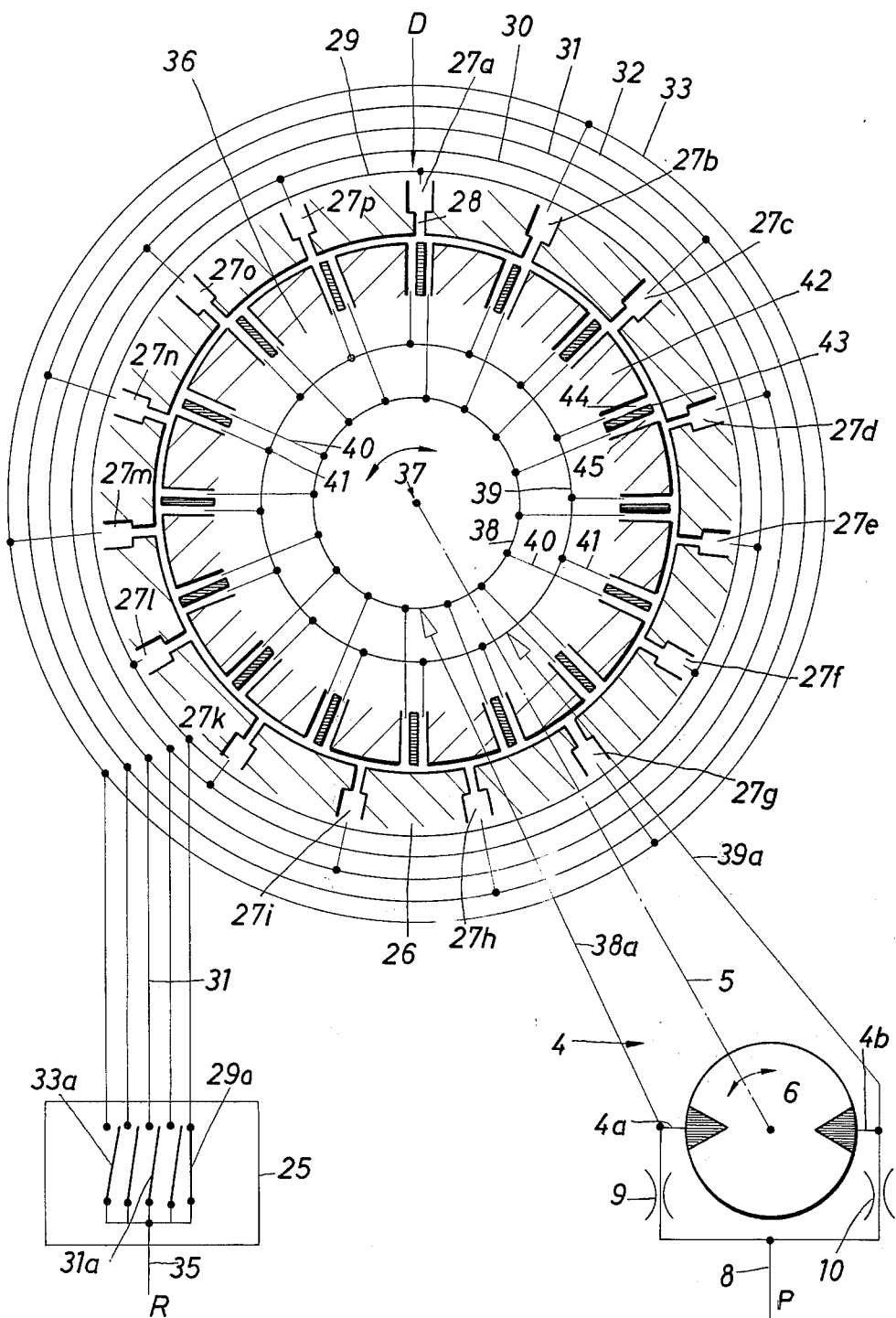

HYDRAULIC STEP-MOTOR

BACKGROUND OF THE PRESENT INVENTION

The present invention is related to an apparatus for controlling the indexing of hydraulic stepping motor and in particular to a servo-valve for controlling the flow of htdraulic fluid thereto.

Hydraulic stepping motors are known which are constructed as a linear motor in form of a pressure fluid cylinder or in form of a hydraulic rotating motor. In either case it is known to combine such motors with a control or servo-valve comprising slide valve having a reciprocable linear shift member or with a member reciprocably rotatable about a central axis (see German Pat. No. OS 1,550,365). In connection with slide valves having a linear shiftable member it is possible and known to use also asymmetric pistons.

It is an object of the instant invention to provide improved apparatus for the control of hydraulic motors which may use any of these combinations. The apparatus may also be provided known intermediate amplifiers or gears altering the gear ratio between the hydraulic motor and the control valve.

It is the object of the instant invention to develop a hydraulic step motor of the type described in such a way as to render possible in a simple construction a high number of step positions and one having little leakage. In addition it is the object to provide a device having a very good dynamic performance, an insensitiveness against varying load moments, higher start-stop-frequencies and step losses.

According to the invention these tasks are solved by providing in conjunction with a hydraulic stepping motor a servo-control system comprising a slide valve comprising a housing and a slidable valve member arranged in, and coextensive with, the housing. The slidable valve member includes at least two fluid manifolds conjointly movable therewith and a plurality of primary positioning webs and secondary sealing webs alternately spaced from one another and uniformly distributed over its periphery. These projections define a plurality of intermediate gaps alternately connected with one or the other of the fluid manifolds. A plurality of uniformly distributed channels provided in the housing opens against these webs. The channels have a width identical with the peripheral width of the primary projections, but have mutual distances different from those existing between the primary projections and are fewer in number than these primary projections.

The main connecting conduits provide communication between the source of fluid under pressure and the fluid manifolds. A plurality of return conduits, each of which is connected to one of the channels, is coupled to a selector valve comprising a plurality of control valves each communicating with at least one of the return conduits. The control valves are actuable to couple a selected return conduit to a return duct outlet opening into a sump whereto the source of fluid under pressure is connected to receive therefrom the fluid it pressurizes.

In idle condition a uniform pressure exists as long as the valves in the selector are closed. In response to the opening of one of the valves, the corresponding intermediate gap discharges the fluid through its corresponding channel and the return fluid conduit, via the opened valve into the sump, thus a drop of pressure being provoked in the discharging gap and the step motor being caused to revolve in the decreased pressure direction. Then, one of the primary webs moves towards and covers the previously opened channel and finally blocks it. Therefore, the rotary valve member ceases to move and the fluid escape channel closure restores the pressure in the servo-valve, so that the rotation stops after a predetermined step only. Thus an effective control of step rotation is provided.

Preferably the servo-valve is of a rotary type including a rotatable cylindrical member housed in a cylindrical wall. The webs comprise radial projections. However, linear housing and slide members may be used since these too can be made with projecting webs and channels.

An advantage of the foregoing construction lies in the fact that by connecting the gaps between the webs, on the same facial sides, to a common manifold, indexing in opposite directions can be obtained in one or more steps.

It is particularly useful if in the preferable embodiment each separating web is broadened up to form a sealing member in such a way that in each position of the movable member at least some of the channels in the valve housing are covered by the sealing web.

The present invention results in a high number of indexing positions, together with a very small possibility of leakage. Due to this diminished leakage the dimensions of the slide valve may be significantly decreased in comparison with known systems having an equal number of positions. Furthermore, the number of control valves necessary in the selector valve device may be substantially decreased so that there is a remarkable decrease in constructive expenditure. The width of the separating webs, respectively, may in order to obtain a favorable behavior in operation, be chosen so that at both sides of each positioning web there remain gaps which are slit like ducts having a width corresponding to the width of the positioning web itself.

Preferably, the number of channels is nearly equal to the number of the positioning webs. Most favorably the number of the positioning webs and the number of the channels differ only to the extent of the valve 1.

Furthermore, it is useful if the conduits of two or more non-adjacent channels are connected to the return conduit via a single control valve of the selector valve device.

The invention will be described in more detail in the following with reference to the attached drawings showing two embodiments.

BRIEF DESCRIPTION OF THE DRAWINGS:

FIG. 2 is a sectional view similar to FIG. 1 embodiment of the present invention.

Figure 1:
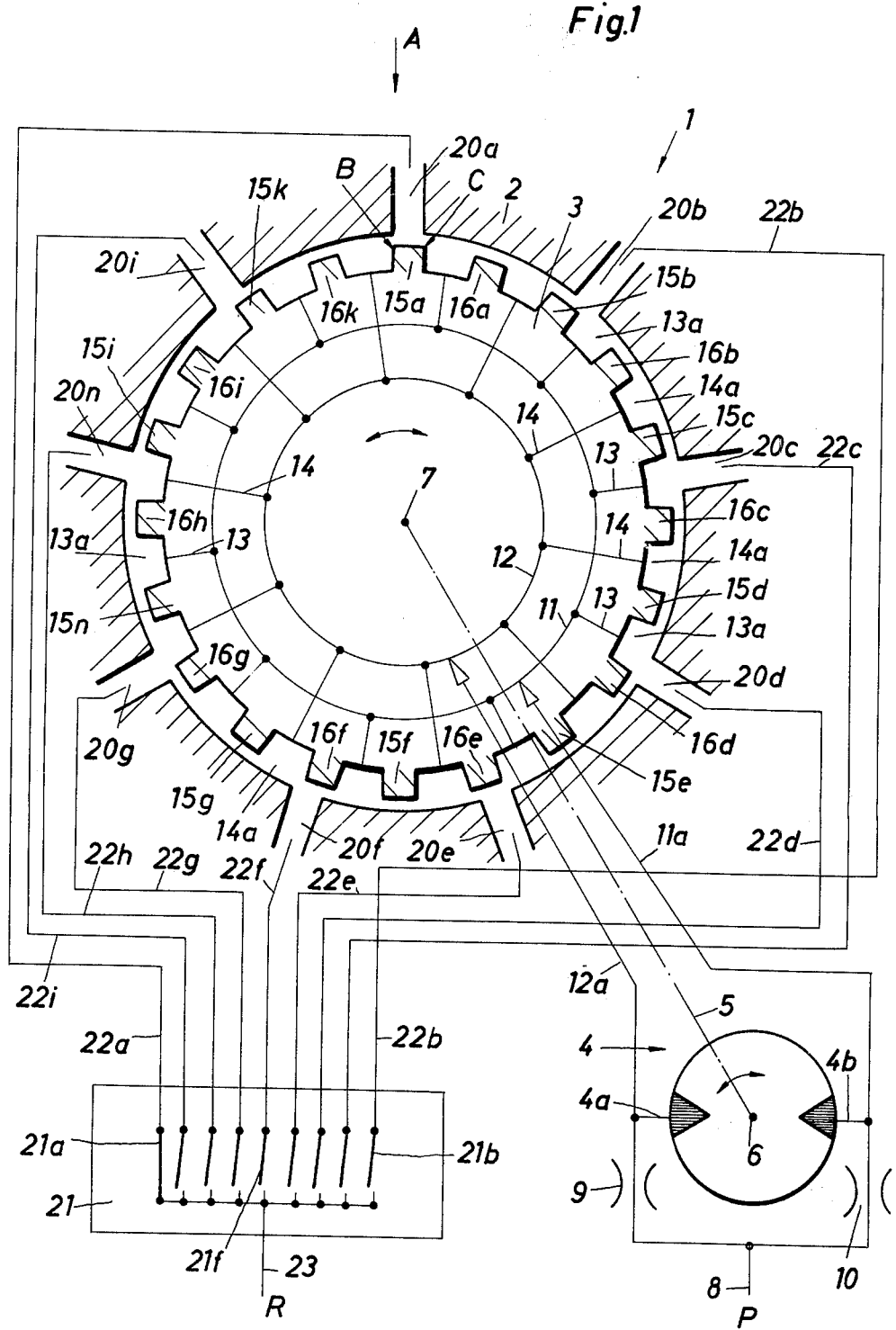
FIG. 1 is a sectional view of one embodiment of the present invention showing the step motor, the servo-valve and the interconnecting conduits.

In the embodiment according to FIG. 1 there is provided a step motor comprising a slide valve generally depicted by the numeral 1 having a rotor member 3 located in a fixed housing 2. The axis 7 of rotation of the movable member 3 is connected to the axis 6 of rotation of a hydraulic motor 4 via gear 5. The step motor is mechanically linked to a conventional hydraulic motor 4 via a gear chain 5. The gear chain 5 connects the supporting central axis shaft 6 of the hydraulic motor and the supporting central axis shaft 7 of rotor member 3. The hydraulic motor has a pair of opposed cavities which are connected to a source of fluid such as hydraulic oil or the like via two conduits 4a and 4b connected to a common pressure line 8 in which throttle members 9 and 10 respectively, are located. The two conduits 4a and 4b are, moreover respectively connected via conduits 11a and 12a to manifolds 11 and 12 located concentrically in the rotor member 3.

A set of positioning webs 15a–15k formed of a plurality of primary radial projections are distributed uniformly at equal distances about the circumference of the rotor member 3. Centrally located between each of two adjacent positioning webs is a second set of secondary radial projection forming separating webs 16a–16k. Alternating between each web 15 and 16 are two series of gaps 13a and 14a. All of the gaps 13a are connected via conduits 13 and the manifold 11 while all of the gaps 14a are connected via conduits 14 to the manifold 12.

The housing 2 of the slide valve 1 is provided with perforations or channels 20a and 20i distributed uniformly at equal distances about the circumference of the rotor member 3. The peripheral distance between two channels in each adjacent pair is only slightly greater than the peripheral distance between two adjacent positioning webs. Nevertheless, the numbers of the positioning webs and of the channels are nearly equal. In FIG. 1 there are provided 10 positioning webs 15a–15k and 9 channels 20a–20i. The width of the opening of the channels 20a–20i corresponds generally to the distance between the control or frontal edges B and C of each positioning web 15a–15k, facing in opposite directions.

Each channels 20a–20i is connected via a conduit 22a–22i to a multiple selector valve device 21. This selector valve device 21 comprises several individual valve units 21a–21i, preferably one valve for each channel. The valve unis 21a-21i are connected in common by a return conduit 23 to a fluid sump (not shown) from which the pressurized fluid for the hydraulic pump is taken. Each valve unit 20a–20is normally in the closed or shut position and may be switched to the open position selectively so as to connect the corresponding channel 20a–20i to the return conduit 23.

In the described arrangement each step position of the step motor may be approached directly or in several steps i.e., via intermediate step positions. Such step positions are illustrated in FIG. 1 where the step-motor is located in the stop position marked A by the slide valve. Here the rotor member 3 is stopped at a position which effects a halt or rest position in the hydraulic motor. The rotor member 3 is stopped so that the positioning web 15a is opposed to and covers the channel 20a which itself is connected to the return conduit 23 via the corresponding valve unit 21a, itself placed in closed position. Despite the open position of the channel 20a and valve 21a hydraulic fluid such as oil cannot leave either of the two manifolds 11 and 12 because its discharge through gaps 13a or 14a is blocked by the positioning web 15a. Therefore, both conduits 4a and 4b of the hydraulic motor are kept under equal pressure and the hydraulic motor itself is caused to stop in the position shown, maintaining a rest position.

It is desired to transfer the step motor to the following step position, viz. in clockwise direction, the valve 21a of the selector valve 21 is closed and the valve 21b corresponding to the channel 20b is opened. Consequently, web 15b which is opened along its control edge C to the channel 20b, exposes the gap 13a, permitting the flow of fluid from the manifold 11 to the return conduit 23 resulting in the decrease of pressure within the feed conduit 4b of the hydraulic motor 4 due to throttling of the pressurized fluid via the throttle member 10. The hydraulic motor in this unbalanced condition starts rotating clockwise under the effect of the pressurized sources driving the rotor member 3 with it, because of the mechanical gear connection 5 and also in the clockwise direction. The rotor 3 thereupon moves in the clockwise direction carrying the positioning web 45 until it reaches a position exactly opposite the channel 20b. In this position the channel 20b is blocked by the positioning web 15b causing the build up of equal pressure in both conduits 4a and 4b. In this position the stepping motor as well as the hydraulic motor comes to a stillstand. To approach the step position in the opposite direction as characterized by channel 20i (i.e. following position A in the anti-clockwise direction), valve unit 21i of the selector valve 21 is closed so that a connection between the manifold 12 and the channel 20i is opened along the frontal control edge B of the positioning web 15c. The connection continues to the return sump via valve 21i and return conduit 23. This connection reduces the pressure in conduit 4a causing the hydraulic step motor to swing in the anti-clockwise direction carrying along with it the motor member 3 until the positioning web 15c blocks the associated chanel 20.

The maximum change of position without an intermediate step is achieved as a result of the given number of valves and equals:

$$\tfrac{1}{2} n_v \cdot S$$

wherein
$n_v$ = number of valves and
$S$ = Step length.

One of the arrangements of the separating webs 16a–16k between the adjacent members of each pair of adjacent positioning webs the areas between each of the control edges B and C, respectively, facing the same direction of rotation will be connected to the same manifold 12 and 11, respectively. Thereby both control edges B and C are effective as piston walls to effect movement of the rotor on passage of fluid. According to this arrangement the possible number of step positions is equal to the product of the number of positioning webs 15A to 15K and the number of channels 20a to 20i. In the illustrated example there are provided ten positioning webs and nine channels resulting in a total of ninety step positions, each of which is approchable in one or the other direction of rotation in a single step or via a series of steps.

Since the number of the channels is greater than three the operation of the step motor in both directions is assured. Despite the high number of possible step positions, the expenditure for manufacture is low, especially in the case when the number of channels is nearly equal to the number of positioning webs. In this case, it is necessary to perform two milling cuts for each channel and for each positioning web. In addition, only a slight leakage occurs with the present construction compared to known arrangements.

So long as the difference between the desired and the actual position of a first positioning mechanism in the embodiment illustrated in FIG. 1 amounts to ± 4 or 5 steps no snap over, that is no step loss, occurs during the operation. This results in an improved dynamic behavior of the step-motor, since it shows a considerable insensitivity to fluctuations in load moments. Also the frequency may be increased, i.e. the frequency with which the step-motor may be started from a standstill position without losing one step.

While in the embodiment according to FIG. 1 one valve unit of the selector device 21 is associated with each channel, a considerably less complicated arrangement can be constructed as illustrated in the embodiment according to FIG. 2.

In the embodiment of FIG. 2 as in the previous embodiment, stepping motor 4 is connected via the two connecting conduits 4a and 4b to the fluid pressure source via throttle members 9 and 10 and conduit 8. The driving shaft 6 of the step motor is connected via a gear chain or the like 5 connected to the shaft 37 of the movable member 36 of the servo-valve. The movable member is designed in the shape of a rotatable slide rotor, and is located within a circular housing 26.

The movable member 36 is provided with two manifolds 38 and 39 connected in constant communication with the two conduits 4a and 4b of the hydraulic motor. The movable member 36, is formed about its periphery with a plurality of comparatively small positioning webs 43 alternating with relatively enlarged separating webs 42. The positioning webs 43 are located in radially recessed gaps formed by small slits 44 and 45 positioned on opposite sides of the web 43. Sixteen radial gaps are provided, uniformly spaced about the axis 37 with comparatively small positioning webs 43 each having two control edges facing in opposite direction into each slot. The small slits 44 and 45, respectively, correspond in width nearly to that of the width of the webs. Slits 44 facing in the same direction of rotation, are commonly connected to the manifold 39 via connecting conduits 41 while all slits 45 facing in the opposite direction of rotation are connected in common with the manifold 38 via connecting conduits 40.

The movable member is surrounded by a housing 26 in which is provided radial channels 27a to 27p. The distance between adjacent channels is slightly greater or smaller than the distance between adjacent positioning webs 43, however, the number of channels is nearly equal to the number of the positioning webs. In the illustrated examples there are provided sixteen positioning webs and fifteen channels, 27a through 27p, each of which is narrowed to form a small slit 28 opening into the area of the annular space between housing and rotatable member.

The housing 26 is also provided with a plurality of annular manifold channels 29, 30, 31, 32 and 33 which are connected to a selector device 25 by a plurality of conduits 31. The selector device 25 is formed of a plurality of conduits 31. The selector device 25 is formed of a plurality of individually operable valve units 29a, 30a, 31a, 32a and 33a each corresponding respectively to one of the annular manifold channels. The valves 29a–33a are connected in common by conduit 35 to the sump return for the fluid. As seen, the valve housing 26 has five valve units 29a - 33a. Consequently, when opening one of the valves e.g., valve 29a, the corresponding manifold 29 may be connected to the common return conduit 35, and so forth.

In this embodiment the separating webs 42 between adjacent positioning webs 43 are peripherally enlarged to form sealing means with the inner surface of the housing so that part of the channels are covered by the separating web and are closed against usual leakage. This renders possible the connection of several channels 27 to the same manifold as long as the channels so connected in common are not adjacent to each other. Accordingly channels 27a, 27f and 27l are connected to the common manifold 29 leading to valve 29a of the selector 25. In the shown position the manifold 29 is connected to return conduit 35 via valve 29a. The step position of the arrangement according to FIG. 2 is marked D. In this position while the channel 28 is blocked by the corresponding positioning web 43, the channels 27f and 27l connected to the same manifold 29 are not blocked by the corresponding web. They are, however, sealed by a corresponding separating mechanism as is easily derived from FIG. 2.

If, starting from the position, D, as shown, the stepposition following in clockwise direction is to be approached, then the valve 29a is closed and valve unit 33a of the selector device 25 is opened to the return conduit 35. This connects the manifold 33 to the return conduit 35. The hydraulic fluid, such as oil flows from the manifold 38 in the center of the movable member 36 outwardly through the channel 27b which is connected to manifold 33. The channels 27g and 27m connected to the very same manifold are each sealed by a separating web. The step-motor 4 starts rendering in clockwise direction until the movable member 36 connected to it via the gear chain 5 reaches a position in which the channel 27b is blocked by the positioning web which in FIG. 2 moves directly in front of this channel and causes the flow of fluid to come to rest. By this means the hydraulic motor also comes to a stillstand in the next step position.

According to the embodiment as shown in FIG. 2 the stepmotor may be controlled into 240 step positions each of which may be approached in a single step or in a series of steps. This movement is effected by opening one of the five valves 29a–33a of the selector valve device 25. In each case one valve is assigned to a series of three channels. Notwithstanding this fact, there results a positive exact movement of the selected step position. Because of the low number of valves compared to the high number of channels the construction of the embodiment of FIG. 2 is simplified to a considerable extent. Also this embodiment results in an excellent dynamic behavior. The approching impulses are distributed sequentially over a greater number of channels so that the loading of the single channels decreases. This is of great advantage for the valves of the selector device which are limited in relation to their shift frequency.

The dimension of the servo-valve is controlled to a considerable extent by the extension of the control plane. This extension as such results from the dimension of the single channels as well as from the dimension of the slits lateral to the positioning webs and cannot be reduced below a certain value for manufacturing reasons. However, the dimensions of the servo valve are still proportional to the ratio of the number of possible step positions and to the number of valves.

I claim:

1. Apparatus for controlling a hydraulic motor having a drive member comprising a servo-valve having a housing and a slide member movable therein, means for connecting said drive member of said hydraulic motor and said slide member of said servo-valve for conjoint movement, a pair of fluid manifolds located in said slide member, and means for connecting each of said manifolds and said hydraulic motor with a source of fluid under pressure, a plurality of positioning webs spaced uniformly about the surface of said slide member, said positioning webs having opposed frontal faces, separating webs respectively interposed between adjacent ones of said positioning webs to form gaps adjacent each frontal face of said positioning webs, means for connecting the gaps adjacent one frontal face of each of said positioning webs to one of said manifolds, and the gaps adjacent the other frontal face of each of said positioning webs to the other of said manifolds, said housing having a plurality of channels distributed uniformly therein with respect to said slide member and at a distance from each other different then the distance between said positioning webs, conduit means connecting said channel means for recovery of said fluid, and valve means interposed in each of said conduits for selectively controlling the flow of fluid therethrough, the number of channels in said housing being less than the number of said positioning webs, fluid being caused to flow on selection of one of said channels through said hydraulic motor, one of said manifolds and ones of said gaps and the selected channels, said fluid acting on the frontal face of the positioning web associated with the corresponding gap through which fluid flows to move said slide member until said associated positioning web blocks the selected channel causing the cessation of fluid flow.

2. The apparatus according to claim 1 wherein the slide member is a cylindrical motor, rotatable about a central axis, and the positioning and separating webs are radially extending projections spaced about the circumference thereof.

3. The apparatus according to claim 1 including a source of fluid under pressure, and valve means interposed between said course and said hydraulic motor and said servovalve.

4. The apparatus according to claim 1 wherein said slide member and said drive member are connected by a direct gear transmission.

5. The apparatus according to claim 4 wherein said hydraulic motor comprises a rotary drive member, and said gear transmission links the central shaft of two servo-valve motor and the central shaft of said drive member.

6. The apparatus according to claim 1 wherein said housing is provided with more than three channels and the difference in numbers of channels and positioning webs being at least one.

7. The apparatus according to claim 1 wherein said separating webs have a cross section substantially equal to the channel openings.

8. The apparatus according to claim 1 wherein the separating webs are arranged so that in any position of said slide at least some of said channels are blocked.

9. The apparatus according to claim 1 wherein said positioning and separating webs are of such dimension and are spaced from each other so that the gaps therebetween are substantially equal to the width of said positioning webs.

10. The apparatus according to claim 1 wherein two or more channels not adjacent each other are connected to a single common selectively controlled valve means.

11. A control system for a hydraulic step-motor operated by a fluid under pressure and having a pair of main fluid conduits connected to a source of fluid under pressure, a pressure relief selector, a sump for the returning fluid and a rotation controlling stepping servo-valve drivingly connected to said motor; said stepmotor comprising a cylindrical rotor housing, a cylindrical rotor in said housing and an axle projecting from said rotor, said rotor being provided on its outer wall with a pair of driving cavities situated in opposite relationship to one another and each communicating with one of said main fluid conduits; said servo-valve comprising a cylindrical valve housing and a cylindrical rotary member located in said valve housing and coextensive therewith; said rotary member having a central axle coupled to the axle of said rotor to be entrained thereby and being provided with a plurality of alternately spaced primary positioning and secondary sealing projections uniformly distributed over its periphery and sealingly and slidably engaging the inner surface of said valve housing; said primary and secondary projections defining therebetween a plurality of intermediate gaps; said rotary member also comprising a pair of fluid manifolds each connected to one of said main fluid conduits and alternately to one and the other of said intermediate gaps; said valve housing having a plurality of inwardly opening channels uniformly distributed about said rotary member and, being fewer in number than the primary projections and having interior mouths of a width substantially identical with the peripheral width of said primary projections; a plurality of return conduits being provided respectively connected to one of said channels and coupled to said pressure relief selector; said pressure relief selector comprising a set of valves each communicating with at least one of said return conduits and being actuable to couple a selected one of said conduits to a return duct outlet of the fluid into said sump and thus to relieve the fluid pressure in the selected rotor cavity, fluid manifold and intermediate gap, so that both the stepmotor and the rotary member are caused to rotate in the direction of the intermediate gap wherein the pressure has diminished and to stop after one step rotation when the corresponding primary projection covers and seals the one channel having been opened.

12. The step-motor according to claim 11, comprising more than three channels distributed at equal distances over the entire periphery of said rotary member and being of a number nearly equal to the number of the primary projections, the difference between these numbers being at least one.

13. The step-motor according to claim 11, wherein each one of the secondary projections is broadened on its outside to form a sealing projection capable of closing in each position of the rotary member some of the channels in the valve housing by completely covering the same.

14. The step-motor according to claim 11, wherein the secondary projections are broadened on their outsides to seal the channels in the valve housing to such a width that on both sides of each of the primary projections a slit remains having a width nearly identical with that of said primary projections.

15. The step-motor according to claim 11, wherein the return conduits of two or more channels in the valve housing nonadjacent to one another are connectable to the fluid duct outlet via a single valve of the pressure relief selector.

16. The step-motor according to claim 11, wherein the rotor axle is coupled to the axle of the rotary member via gearing means.

17. The step-motor according to claim 11, wherein a throttling means is included in each of the two main fluid conduits communicating with the source of fluid under pressure and with one of said rotor cavities and one of said fluid manifolds.

* * * * *